(12) United States Patent
Crownover et al.

(10) Patent No.: US 10,011,134 B2
(45) Date of Patent: Jul. 3, 2018

(54) CHEMICAL ETCHED TWO DIMENSIONAL MATRIX SYMBOLS AND METHOD AND PROCESS FOR MAKING SAME

(71) Applicant: Texas Nameplate Company, Inc., Dallas, TX (US)

(72) Inventors: Roy Dale Crownover, Dallas, TX (US); Ronnie Dwaine Phelps, Dallas, TX (US); Preston Cray Smith, Dallas, TX (US)

(73) Assignee: Texas Nameplate Company, Inc., Lancaster, TX (US)

( * ) Notice: Subject to any disclaimer, the term of this patent is extended or adjusted under 35 U.S.C. 154(b) by 1144 days.

(21) Appl. No.: 14/136,016

(22) Filed: Dec. 20, 2013

(65) Prior Publication Data

US 2014/0116574 A1    May 1, 2014

Related U.S. Application Data

(63) Continuation of application No. 12/200,797, filed on Aug. 28, 2008.

(60) Provisional application No. 61/052,641, filed on May 12, 2008.

(51) Int. Cl.
| | |
|---|---|
| *B42D 15/00* | (2006.01) |
| *B42D 15/10* | (2006.01) |
| *G09C 3/00* | (2006.01) |
| *B41M 3/00* | (2006.01) |
| *G06K 19/06* | (2006.01) |
| *B42D 25/43* | (2014.01) |

(52) U.S. Cl.
CPC ............ *B41M 3/001* (2013.01); *B42D 25/43* (2014.10); *G06K 19/06121* (2013.01); *G06K 19/06037* (2013.01)

(58) Field of Classification Search
CPC . B41M 3/001; B42D 25/43; G06K 19/06121; G06K 19/06037
USPC ......... 281/5; 283/67, 70, 72, 73, 74, 98, 901
See application file for complete search history.

(56) References Cited

U.S. PATENT DOCUMENTS

| | | | |
|---|---|---|---|
| 3,179,530 A | 4/1965 | Erikson et al. | |
| 5,178,989 A | 1/1993 | Heller et al. | |
| 5,931,753 A | 8/1999 | Ichida | |
| 5,937,753 A | 8/1999 | McKeever | |
| 6,082,263 A | 7/2000 | Koguchi et al. | |
| 6,118,377 A | 9/2000 | Bonkowski et al. | |
| 6,120,977 A | 9/2000 | Kaimoto et al. | |
| 6,568,821 B1 | 5/2003 | Page et al. | |
| 2002/0187501 A1* | 12/2002 | Huang ................ | B01J 19/0046 435/6.19 |
| 2006/0028013 A1 | 2/2006 | Schmitt et al. | |
| 2006/0044330 A1 | 3/2006 | Fournier | |
| 2006/0060563 A1 | 3/2006 | Kim et al. | |
| 2006/0098235 A1 | 5/2006 | Bourne et al. | |

(Continued)

*Primary Examiner* — Justin V Lewis
(74) *Attorney, Agent, or Firm* — Winstead PC (57) ABSTRACT

A chemically etched two dimensional matrix symbol is provided on a substrate. The substrate may be metal or plastic. In another embodiment, a process is described for forming a plurality of two dimensional matrix symbols at the same time in batches. The two dimensional data matrix symbol comprises a substrate, a plurality of grooves and a plurality of raised areas and a plurality of ink spots disposed in the grooves according to a predefined code. The matrix is readable by a scanning device.

10 Claims, 5 Drawing Sheets

(56) References Cited

U.S. PATENT DOCUMENTS

2006/0290136 A1 12/2006 Alasia et al.
2007/0095929 A1 5/2007 Cote et al.
2010/0316849 A1* 12/2010 Millward .............. B81C 99/009
  428/195.1

* cited by examiner

Fig. 1

Fig. 2: Substrate from CTS machine after waxing

Fig. 3: Substrate after rinsing the wax

Fig. 4: Substrate after application of resist

Fig. 5: Substrate after etching

Fig. 6: Substrate after paint

CHEMICAL ETCHED TWO DIMENSIONAL MATRIX SYMBOLS AND METHOD AND PROCESS FOR MAKING SAME

CROSS-REFERENCES TO RELATED APPLICATIONS

This patent application is a continuation of U.S. patent application Ser. No. 12/200,797, filed on Aug. 28, 2008. U.S. patent application Ser. No. 12/200,797 claims priority from U.S. Provisional Patent Application No. 61/052,641, filed on May 12, 2008. Each of the two above-referenced patent applications is incorporated herein by reference in its entirety.

TECHNICAL FIELD

The present invention relates in general to the field of chemical etching and two dimensional matrix symbols, and more particularly to a product, system and methods for creating nameplates carrying two dimensional matrix symbols on metal and non-metal substrates.

BACKGROUND OF THE INVENTION

Two dimensional matrix symbols or two dimensional data matrix symbols embodied on nameplates may be created by different processes and some current methods include laser engraving. One disadvantage of some of the prior methods is that the nameplates carrying the two dimensional matrix symbols must be done one at a time in a serial manner. Therefore, there is a need for a process that can create nameplates in batches and for creating two dimensional matrix symbols etched on metal and non-metal durable substrates. There is also a need for a robust commercial nameplate and two dimensional matrix symbol that can remain unaltered under harsh environmental conditions for the lifetime of the equipment to which it is attached.

BRIEF SUMMARY OF EMBODIMENTS OF THE INVENTION

According to one embodiment of the invention, a chemically etched two dimensional matrix symbol is provided on a substrate. The substrate may be metal or plastic.

In a variant, a plurality of chemically etched two dimensional matrix symbols may be formed simultaneously on substrates in a batch process.

In another variant, the chemically etched two dimensional matrix symbol comprises a plurality of ink spots.

In a further variant, a two dimensional matrix symbol comprises: substrate; a plurality of grooves having a bottom surface disposed in the substrate; a plurality of raised areas relative to the grooves, disposed on the substrate; a plurality of ink spots chemically bonded to the substrate in the grooves and arranged according to a predetermined code, wherein the arrangement is configured to convey information determined by the code; a perimeter defined by the plurality of grooves and ink spots; and wherein the two dimensional matrix symbol is readable by a scanning device for converting the arrangement into human readable characters.

In still another variant of the chemically etched two dimensional matrix symbol, the ink completely covers the bottom surfaces of the grooves.

In yet a further variant, the ink is comprised of a black color. In other embodiments, the ink may comprise other colors, such as green, red, blue, yellow, purple, brown and orange or any color within the visible spectrum.

In another variant, the chemically etched two dimensional matrix comprises a square symbol of less than 0.25 square inches.

In a further variant, the information conveyed by the arrangement comprises 200 alpha numeric characters.

In still another variant, the two dimensional matrix symbol comprises a square symbol of less than 0.0625 square inches.

In a yet a further variant, the two dimensional matrix symbol is a IUID symbol.

In another variant, a batch process for simultaneously forming a plurality of two dimensional matrix symbols onto a single substrate is provided. The batch process may comprise a process for chemically etching a two dimensional matrix symbol onto a substrate. The process may comprise: pouring a resist on a clean substrate; evenly distributing the resist over the substrate; drying the resist evenly across the substrate; covering the substrate with a film for selectively covering some areas of the substrate to form a two dimensional matrix symbol to be etched; exposing the film to UV light; placing the substrate into developer liquid for developing the resist rinsing and drying the substrate; and etching the exposed areas of the substrate.

In a further variant, a system for chemically etching a two dimensional matrix symbol may comprise an input module for carrying a specification for a nameplate. The system may have an artwork preparation module for creating an image in a digital in accordance with the specification in the input module. The system may have a roller frame subsystem having a polyester silk-screen fabric having a strand count between 195 and 355 strands per square inch. The silk-screen fabric may be stretched over a Newman roller frame at tension between 10 and 14 Newtons.

The system may have an emulsion preparation module that follows a manufacturer's guidelines in the preparation of an emulsion for pouring the emulsion into a trowel bed configured to slide over a screen frame twice on both sides. The trowel may be applied to a substrate side before it is applied a concave side of a frame comprising the substrate. The system may have a drying module for drying the screen frame prepared in the roller subsystem under a heated condition at 140 degrees Fahrenheit for 25 minutes under an ultraviolet protected environment. The system may have a waxing module having a CTS machine for applying wax to the screen prepared by the drying module. The system may have a resist module for transferring the image to a substrate and applying a solvent-based resist to the substrate. The system may have a curing module for curing the substrate for between 10-12 minutes at a temperature of 350 degrees Fahrenheit. The system may have a pre-etching module for applying a mixture of 5% HF and 95% water to the substrate. The system may have a chemical etching subsystem for conducting chemical etching, wherein the chemical etching subsystem is controlled by an acid temperature and speed of the conveyor.

The system may have a cleaning module for cleaning the substrate, comprising: a plate; a de-smut chamber; a conveyor belt; and a rinse chamber. The cleaning module may be configured to send the plate through the de-smut chamber via the conveyor belt and the cleaning module may be configured to clean the substrate using 2% HF solution. The substrate is cleaned with water in the rinse chamber. The system may have a paint module configured to apply paint to the etched substrate either by an electroplating process or by using a paint gun to spray paint onto the etched substrate.

The system may have a second cleaning sub-process for cleaning the substrate with a solvent-based chemical, comprising: 45% Toluene, 30% Xylene, and 25% Lactol. The system may have a sub-process for lacquering the substrate. The system is capable of chemically etching a plurality of two dimensional matrix symbols simultaneously in parallel in batches, without the need for separate systems. The plurality of matrix symbols can be chemically etched simultaneously by the same process or system described herein.

In a variant of the system the resist is a 75% solvent based resist mixed with 25% asphalt.

In another variant, the system is configured to etch aluminum by applying a FeCl2, Cupric, HCl mixture at a speed of up to 3.00 ft/min.

In a further variant, the system is configured to etch on steel by applying a Nacl, FeCl2, HCl mixture at a speed of up to 2.75 ft/min.

In yet a another variant, a post-etching module is configured to apply a solution of 2% HF and 98% water.

In still a further variant, the paint is applied and baked at a temperature of 350 degrees Fahrenheit for between 10 and 17 minutes.

In another variant, the system is configured to clean the substrate after painting by using mixtures of 40% Toluene, 25% Lactol and 30% Xylene.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 7:
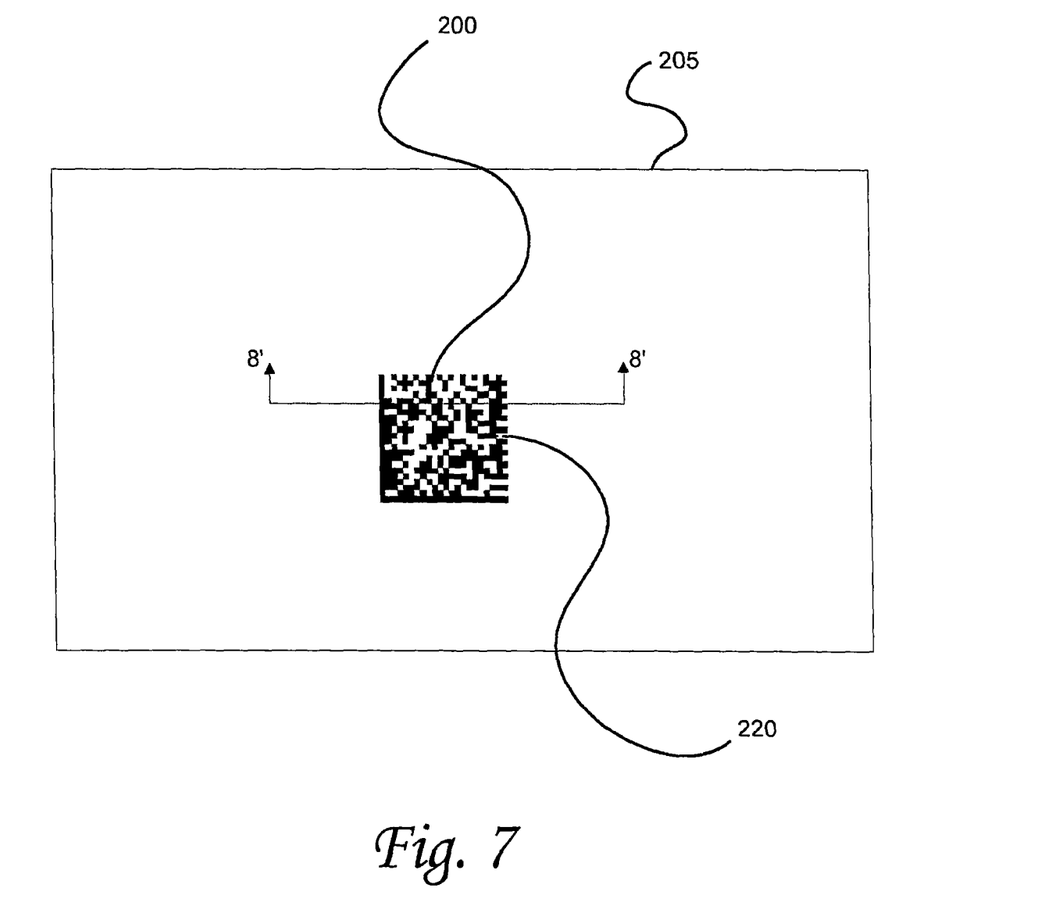
FIG. 7 is an illustration of a chemically etched two dimensional matrix symbol according to the principles of the invention.
Figure 8:
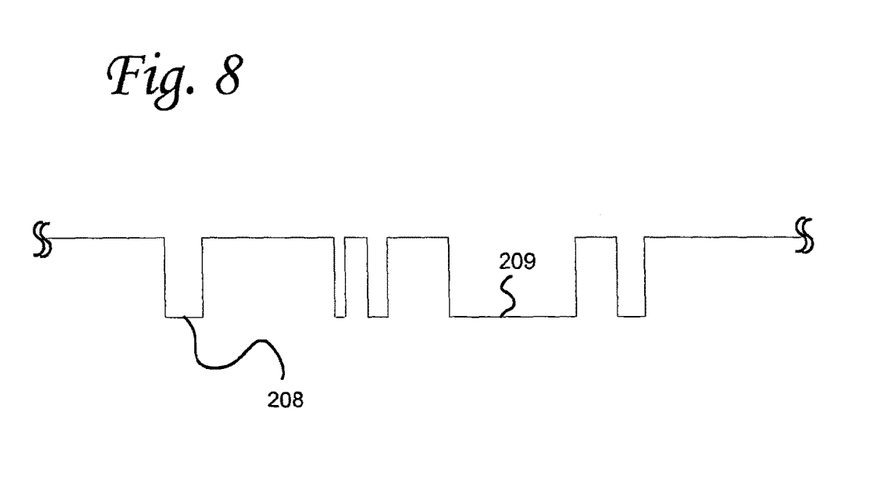
FIG. 8 is cross section of the chemically etched two dimensional matrix symbol along the line 8'-8' without ink applied.
Figure 9:
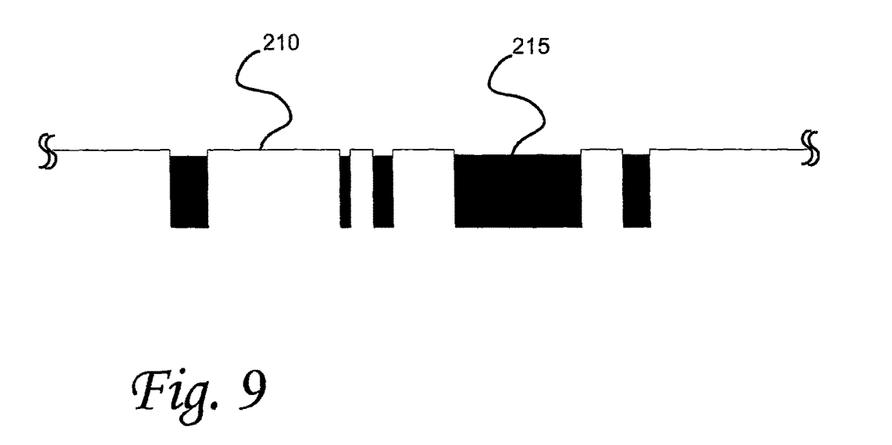
FIG. 9 is cross section of the chemically etched two dimensional matrix symbol along the line 8'-8'.

Referring to FIGS. 7-9, the present invention is directed toward a chemically etched two dimensional matrix symbol 200 on a substrate 205 and a method and system for making same. The substrate 205 may be metal.

In a variant, a two dimensional matrix symbol comprises a substrate 205. A plurality of grooves 208 having a bottom surface 209 are disposed in the substrate 205. A plurality of raised areas 210 relative to the grooves, are disposed on the substrate 205. A plurality of ink spots 215 are chemically bonded to the substrate in the grooves 208 and arranged according to a predetermined code, wherein the arrangement is configured to convey information determined by the code. The two dimensional matrix symbol has a perimeter 220 defined by the plurality of grooves and ink spots. The two dimensional matrix symbol is readable by a scanning device for converting the arrangement into human readable characters.

In another variant of the chemically etched two dimensional matrix symbol, the ink completely covers the bottom surfaces of the grooves.

In yet a further variant, the ink is comprised of a black color. In other embodiments, the ink may comprise other colors, such as green, red, blue, yellow, purple, brown and orange or any color within the visible spectrum.

In another variant, the chemically etched two dimensional matrix comprises a square symbol of less than 0.25 square inches.

In a further variant, the information conveyed by the arrangement comprises 200 alpha numeric characters.

In still another variant, the two dimensional matrix symbol comprises a square symbol of less than 0.0625 square inches.

In a yet a further variant, the two dimensional matrix symbol is an IUID symbol.

Figure 1:
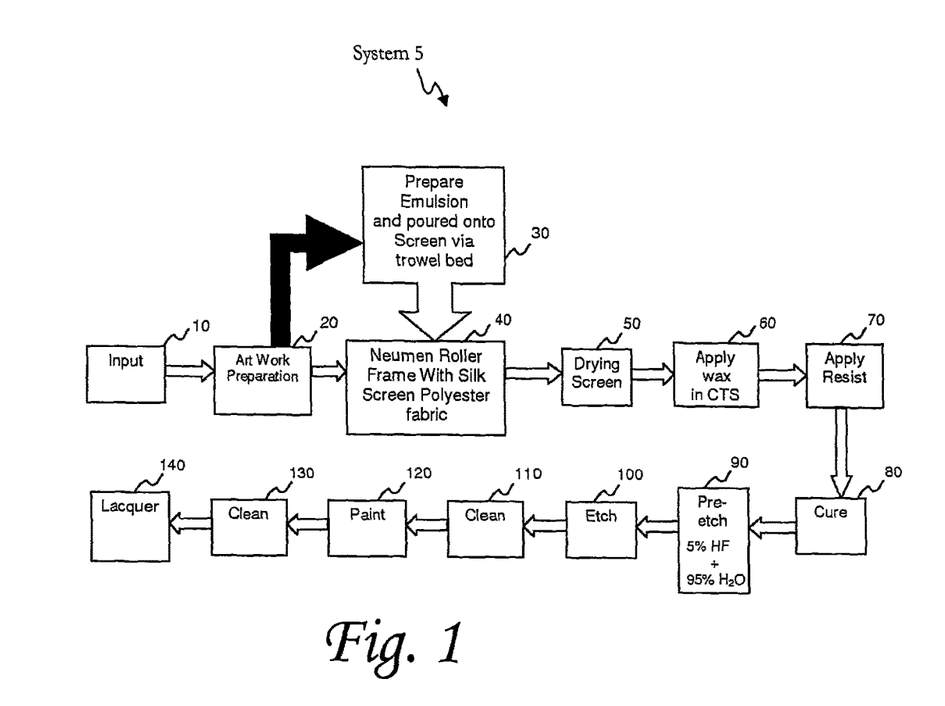
FIG. 1 is one embodiment of a system for chemically etching a two dimensional matrix symbol.

In a variant, a system and method for is disclosed for chemically etching two dimensional matrix symbols on a substrate 205. The method and system may form the two dimensional matrix symbols in a batch process wherein a plurality of two dimensional matrix symbols, for example an IUID, are formed simultaneously. The processes is capable of producing two dimensional matrix symbols embodied on durable substrates for enduring harsh environments. Referring to FIG. 1, one embodiment of a system 5 for preparing a nameplate and UID specification is illustrated. The system 5 may include modules for: artwork preparation 20, emulsion preparation 30, waxing 60, applying resist 70, etching 100, painting 120 and cleaning 130. In the illustrated embodiment, the system 5 includes one or more input modules 10 carrying a specification for a two dimensional matrix symbol.

The system 5 may include an artwork preparation module 20 for creating art in a digital format that may include typical formats such as, but not limited to GIF, PEG, PDF and TIF image file formats in accordance with the specification in the input module 10. The module 20 may contain commercially available software performing the functions of the module 20.

The system 5 may include an emulsion preparation module 30 that follows manufacturer's guidelines in the preparation of an emulsion. One commercially available direct emulsion is KIWOCOL, which is a trademark for a proprietary emulsion from KIWO, Inc. KIWOCOL is a photo sensitive liquid, having Polyester as its key ingredient. Five gallons of KIWOCOL is mixed with 75.5 grams of Sensitizer (Acrylic Oligomer) to activate the emulsion and make it ready for use. The emulsion forms a chemical film on the polyester silk screen.

The system 5 may include a roller frame subsystem 40 that works concurrently with the emulsion preparation module 30. In one embodiment of the roller frame subsystem 40, the roller frame subsystem 40 has a polyester silk-screen fabric that consists of 305 strands per square inch (spsi) stretched over a Newman roller frame of standard 38 inch× 32 inch in size. One range of strand count may be between 195 spsi to 355 spsi. 195 spsi provides for a heavy coverage of substrate but sacrifices sharpness of image while 355 spsi count provides a sharper image but less coverage.

The type size (or text size) determines what strand count silk frame should be selected. The smaller the type size, the higher the required strand count. One can observe under a high power magnifying glass, that when there are fewer number of strands per square inch on the polyester silk screen, a small type size can cause the emulsion to bridge in between strands, thereby making the image less stable. In a preferred embodiment, a strand count of 305 is optimal for a sharp image.

The tension on the stretch of the screen may be kept between 10-14 Newtons in accordance with manufacturer's recommendation for the polyester silk screen. The emulsion that is prepared in the pouring subsystem 30 is poured into a trowel bed that slides over the screen frame twice on both sides. The trowel is applied to the substrate side before it is applied to a concave side of the frame.

The system 5 may include a drying module 50 for drying the screen frame prepared in the roller subsystem 40. In one embodiment, the screen is dried under a heated condition at 140 degrees Fahrenheit for 25 minutes under an ultra-violate (UV) protected environment.

The system 5 may include a waxing module 60 that contains a CTS machine for applying wax to the screen prepared by the drying module 50. The CTS machine is registered such that the image of the artwork falls in a correct position on the polyester silk screen. After the image is sent to the CTS machine, black wax is applied on the image, area. The black wax acts as a blocker and is used depending upon the specification of the job. If the particular job requires that the text should be painted and the background or non-text part of the nameplate to be unpainted, the image sent to the CTS would be "negative" and then the CTS machine will know to apply black wax to the background of the silk screen to create an image only. The purpose of this exercise is to make sure that the areas not to be screened are uncured when it passes through the ultra-violet (UV) rays, because only cured emulsion will not let resist pass through, and therefore, only exposed metals can be painted.

Figure 2:
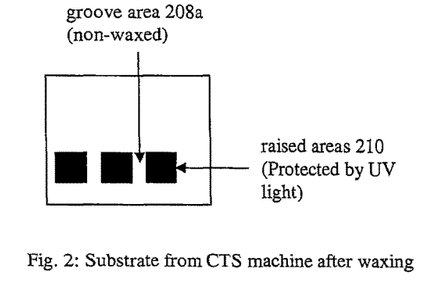
FIG. 2 illustrates a step in a process for etching a substrate wherein the substrate is processed in a Computer To Screen (CTS) machine illustrated in FIG. 1 implemented according to an aspect of the present invention.

After the black wax is applied, the text part retains the color of the emulsion showing that those are ready for being cured at the UV ray chamber. The process may be reversed if the background or non-text part of the nameplate needs to be painted and the text of the nameplate needs to be unpainted, by sending a negative of the image to CTS. Both of these processes are depicted in FIG. 2, which illustrates groove areas 208*a* to be etched and raised areas 210, which are not to be etched or painted. The screen frame, which comprises a substrate 205, is then removed from the CTS machine and placed in an enclosed container for exposure to UV rays. The duration of the exposure is dependent on the size of type and a manufacturer's exposure gauge chart is used for the duration for exposure for each frame. Under the UV exposure the emulsion turns bluish from green.

Figure 3:
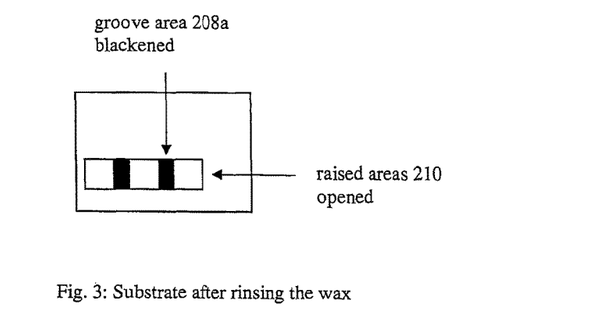
FIG. 3 illustrates a step in a process for chemically etching a substrate comprising rinsing the wax that was formed in CTS machine implemented according to an aspect of the present invention.

The frame is then cleaned with a water jet where black parts are cleaned and look clear and the groove areas 208*a* become black as illustrated in FIG. 3. The screen frame is then dried at 115 degree Fahrenheit. After drying, the frame is placed on a touch up table to correct any imperfection using a small pen and commercially available water based chemical. Masking tape may be applied along the border to keep the ink from running off. The screen frame is then air-dried.

Figure 4:
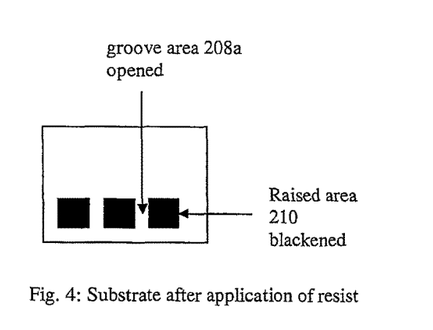
FIG. 4 illustrates a step in process for chemically etching a substrate wherein application of resist illustrated in FIG. 1 is implemented according to an aspect of the present invention.

The system 5 may include a resist module 70, where the image is transferred to a substrate and a proprietary solvent-based resist is applied. The proprietary formula contains a 1:3 mixture of an XZ55 solvent and a liquid Asphathalum respectively to make a 5 KG of the solvent based resist. The XZ55 solvent contains Naphthalene solvent, Naphtha (Petroleum) Heavy and Aromatic (Kerosene). The substrate is placed below the screen frame when Durometer, equipment that measures hardness rubber squeegee. In a preferred embodiment, the hardness required for the rubber squeegee should be at 80 Durometer. When applied on the screen, the hardness level at 80 Durometer gives the squeegee the sharp edge that will help in giving sharper angles to all type sizes, but most importantly for the smaller type sizes. The sharper angles on all type sizes will give clarity to the image. The screen does not make a direct contact on the substrate until pressure is created by squeezing the rubber squeegee. FIG. 4 illustrates the condition of the substrate after resist is applied wherein groove areas 208a appear open and raised areas 210 become blackened.

The system 5 may include a curing module 80 where the substrate is cured by baking. In one embodiment, the curing module 80 is configured to bake the substrate 205 for 10-12 minutes at 350 degree Fahrenheit.

The system 5 may include a module 90 for pre-etching where a mixture of 5% HF and water is applied to clean the substrate.

Figure 5:
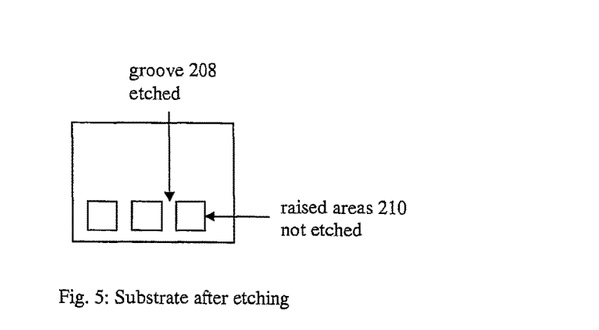
FIG. 5 illustrates a step in a process for chemically etching a substrate wherein chemical etching illustrated in FIG. 1 is implemented according to an aspect of the present invention.

The system 5 may include a chemical etching subsystem 100 where chemical etching is conducted. In one embodiment, the chemical etching process is controlled by the acid temperature and speed of the conveyor. FIG. 5 illustrates the results of the etching on the substrate where the grooves 208 are etched but raised areas 210 are not etched.

The system 5 may contain a cleaning module 110 for cleaning the substrate. During the etching process with Aluminum nameplates, the system 5 may accumulate an ash like residue which is the bi-product of the chemical reaction between Aluminum and the Hydrochloric acid and is referred to as smut. De-smutting is a standard procedure done to clean the smut where the plate goes to a de-smut chamber through a conveyor belt. Thereafter it is cleaned using 2% HF and finally through a rinse chamber where it is cleaned with water for 45 seconds. Other than an aluminum plate, the cleaning is done using water and 5% HF is not used.

Figure 6:
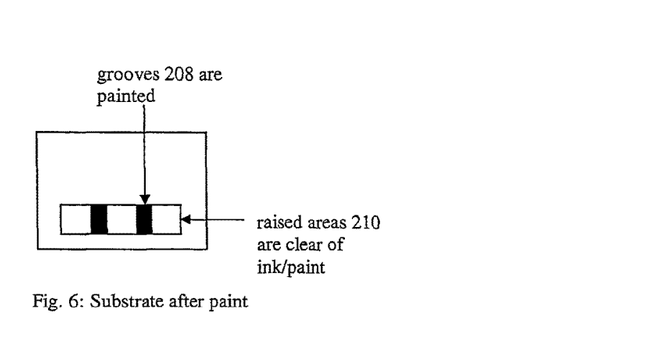
FIG. 6 illustrates a step in a process for chemically etching a substrate wherein the substrate is painted according to an aspect of the present invention.

The system 5 may include a paint module 120 configured to apply paint to the etched substrate either by an electroplating process or by using a paint gun to spray paint onto the etched substrate. The etched substrate is then baked in an oven for 10-12 minutes at 350 degrees Fahrenheit. The result of the paint module 120 operation is depicted in FIG. 6 where the etched text portion is painted but raised areas 210 become clear.

The system 5 may include a cleaning sub-process 130 where the substrate is cleaned by a solvent-based chemical. In one embodiment, the formula for the solvent based chemical is: 45% Toluene+30% Xylene+25% Lactol.

The system 5 includes a sub-process 140 where the substrate is lacquered. This is an industry standard step in the process that is exclusively used for Aluminum substrates.

Figure 10:
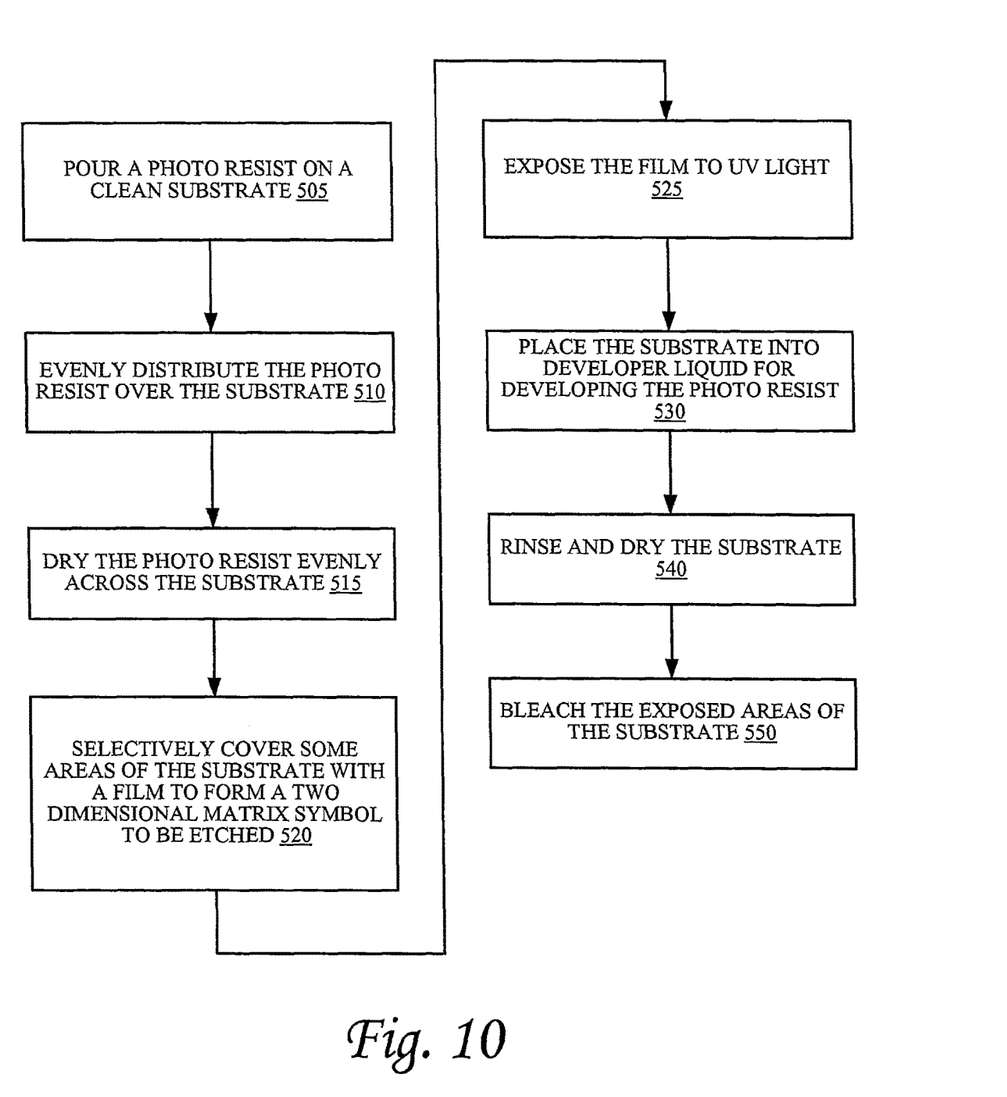
FIG. 10 is flow chart illustrating a variant of a process for chemically etching a two dimensional matrix symbol.

In another variant, referring to FIG. 10, a method for chemically etching a two dimensional data matrix symbol may comprise using the following items: a flat for serving as a metal substrate; a solvent for cleaning or removing grease or oils, and in preferred embodiment, the solvent is KPR, which is commercially available from KODAK company part number 127491-MP111; a spinning device for spinning the flat in an enclosed structure and at a speed to coat the flat with the KPR; an exposing machine for shining UV light onto the flat to expose the areas to be protected on the flat; developer, which a in preferred embodiment is KODAK part number 1376-MP142; a blue resist liquid for covering areas on the flat that are not to be etched; and caustic soda, preferably, sodium hydroxide.

With reference to the items described above, the method may comprise in a step using a solvent to clean the metal flat. In a step 505 KPR is poured on the flat and in a step 510 the flat is moved back and forth to get an even distribution of KPR across the flat. In a step 515, the flat is spun in the spinning device to dry the KPR evenly across the flat. In a step 520 the dried flat is placed in the exposing machine with a negative film or positive film and a vacuum is created to hold the film to the flat. In step 520, some areas of the substrate 205 are selectively covered with the film to form a two dimensional matrix symbol to be etched. In a step 525 the film is exposed to the flat using UV light in the exposing machine for exposing areas of the flat to be protected. In a step 530 the exposed flat is placed into the developer liquid to develop the KPR. In a step, blue dye is sprayed on the flat for viewing the image to be chemically etched and any possible imperfections. In a step 540, the flat is rinsed with water and dried with compressed air using an air compressor. In a step, imperfections are touched up in the metal background with blue resists. In a step 550, when the flat is completely dry, the flat is placed in the caustic soda to bleach the exposed areas. In a step, the flat is rinsed with water and cleaned with a sponge on both sides. In a step, the flat is placed in a tray with solvent for removing the KPR/Blue resist.

The aforementioned methods and processes, for example, those shown in FIGS. 1-6 and 10, permit simultaneous production of chemically etched matrix symbols in a batch process. For example, a large substrate may enter the system 5 or process and have scores of matrix symbols arranged optimally for dividing the large substrate into smaller sections, each containing a chemically etched matrix symbol 200, wherein the scores of matrix symbols are formed in parallel, at the same time, in a batch. For example, the substrate 205 may be chemically etched to have 4 rows of 10 equally spaced apart matrix symbols 200 etched on the substrate 205. Later, the substrate 205 may be sectioned into smaller pieces, wherein each piece contains exactly one chemically etched matrix symbol 200. Thus, a process for creating a plurality of two dimensional matrix symbols on a substrate or on multiple substrates is provided.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of forming a two-dimensional matrix symbol on a metal substrate, the method comprising:
    forming, in the metal substrate, a plurality of grooves and a plurality of raised areas relative to the plurality of grooves;
    chemically bonding ink to the metal substrate in the plurality of grooves formed in the substrate to form a non-human-readable two-dimensional matrix;
    wherein the non-human-readable two-dimensional matrix is readable by a computer;
    wherein the chemically bonding ink to the metal substrate comprises:
        applying a resist on the metal substrate;
        distributing the resist over the metal substrate;
        drying the resist evenly across the metal substrate;
        selectively covering some areas of the metal substrate to form the two dimensional matrix symbol;
        baking and drying the metal substrate; and
        removing the resist with a solvent.

2. The method of claim 1, wherein a plurality of the two-dimensional matrix symbols are simultaneously chemically bonded to the metal substrate in a batch process.

3. The method of claim 1, wherein the ink is black.

4. The method of claim 1, wherein the two-dimensional matrix symbol is an Item Unique Identification (IUID) symbol.

5. The method of claim 1, wherein the computer comprises a scanning device.

6. The method of claim 1, wherein the computer converts the non-human-readable two-dimensional matrix arrangement into human readable characters.

7. The method of claim 1, wherein the two-dimensional matrix symbol on the metal substrate remains unaltered for a lifetime of equipment to which it is attached.

8. The method of claim 1, wherein the ink is blue.

9. The method of claim 1, wherein the non-human-readable two-dimensional matrix fits within a square of 0.25 inches per side.

10. The method of claim 1, wherein the non-human-readable two-dimensional matrix fits within a square of 0.0625 inches per side.

* * * * *